US008638752B2

(12) United States Patent
Gomez Velez et al.

(10) Patent No.: US 8,638,752 B2
(45) Date of Patent: Jan. 28, 2014

(54) METHOD AND SYSTEM FOR HANDLING QOS FLOWS WHEN MOVING BETWEEN SYSTEMS

(75) Inventors: Jose Antonio Gomez Velez, Kanata (CA); Ying Jie Zhao, Kanata (CA); Abey George, Kanata (CA); David Ma, Kanata (CA); Shiva Mirzaei-Rezaei, Kanata (CA)

(73) Assignee: BlackBerry Limited, Waterloo, Ontario (CA)

(*) Notice: Subject to any disclaimer, the term of this patent is extended or adjusted under 35 U.S.C. 154(b) by 529 days.

(21) Appl. No.: 12/943,631

(22) Filed: Nov. 10, 2010

(65) Prior Publication Data

US 2011/0255507 A1    Oct. 20, 2011

Related U.S. Application Data

(60) Provisional application No. 61/325,983, filed on Apr. 20, 2010.

(51) Int. Cl.
*H04W 4/00* (2009.01)

(52) U.S. Cl.
USPC ..... 370/331; 370/230.1; 370/231; 370/235.1; 455/432.2; 455/434; 455/442

(58) Field of Classification Search
None
See application file for complete search history.

(56) References Cited

U.S. PATENT DOCUMENTS

| 7,848,257 | B1* | 12/2010 | Narendran et al. | 370/254 |
| 8,289,861 | B2* | 10/2012 | Zafer et al. | 370/252 |
| 8,351,952 | B1* | 1/2013 | Woleben | 455/450 |
| 2003/0112766 | A1 | 6/2003 | Riedel et al. | 370/252 |
| 2007/0160045 | A1* | 7/2007 | Payyappilly et al. | 370/390 |
| 2007/0286117 | A1* | 12/2007 | Balasubramanian et al. | 370/328 |
| 2009/0005044 | A1 | 1/2009 | Payyappilly et al. | |

FOREIGN PATENT DOCUMENTS

| EP | 1324628 | 7/2003 |
| WO | WO2008008990 | 1/2008 |

OTHER PUBLICATIONS

European Search Report dated Feb. 2, 2011 from EP 10 19 0716.
"Multi-Flow Packet Application", cdma2000 High Rate Packet Data Air Interface Specification, 3GPP2 C.S0024-A, Version 3.0, Chapter 4, Sep. 2006.
"Common Algorithms and Data Structures", cdma2000 High Rate Packet Data Air Interface Specification, 3GPP2 C.S0024-A, Version 3.0, Chapter 14, Sep. 2006.

(Continued)

*Primary Examiner* — Ian N Moore
*Assistant Examiner* — Latresa McCallum (57) ABSTRACT

When a mobile device moves from a first QoS-aware system to a second QoS-aware system, QoS flows may or may not be moved properly. To deal with this, the mobile device requests de-allocation of flows in the second QoS-aware system, and then initiates reservation of flows in the second QoS-aware system. After this, the mobile device will know for certain which QoS flows exist in the second QoS-aware system and can behave accordingly.

22 Claims, 5 Drawing Sheets

(56) References Cited

OTHER PUBLICATIONS

"Evolution-Data Optimized", Wikipedia, the free encyclopedia, downloaded on Apr. 14, 2010, http://en.wikipedia.org/wiki/Evolution-Data_Optimized.

QUALCOMM Engineering Services Group, "How to Ensure QoS in CDMA 2000 EVDO Rev A Systems", downloaded on Apr. 14, 2010, http://www.cdg.org/news/events/cdmaseminar/08_AfricaMidEastConf/07_Qualcomm.pdf.

Chung, Sae-Young, et al, "Performance Evaluation of VoIP over EV-DO Rev A", Nov. 2006, downloaded Apr. 14, 2010, http://www.airvananetworksolutions.com/default/assets/File/Performance_of_VoIP_over_EVDO_RevA_Nov2006.pdf.

"HO-RSVP: a protocol providing QoS support for seamless handover between wireless networks", downloaded Apr. 15, 2010, http://portal.acm.org/citation.cfm?id=1163673.1163693&coll=DL&dl=GUIDE&CFID=2063959&CFTOKEN=37270953.

"Mobile VoKIP over 1xEV-DO, A Technical Whitepaper" Airvana, Inc., downloaded on Apr. 14, 2010, www.airvana.com.

* cited by examiner

FIG. 4

METHOD AND SYSTEM FOR HANDLING QOS FLOWS WHEN MOVING BETWEEN SYSTEMS

RELATED APPLICATION

This application claims the benefit of prior U.S. Provisional Application No. 61/325,983 filed Apr. 20, 2010 hereby incorporated by reference in its entirety.

FIELD

The application relates to systems for handling QoS (Quality of Service) flows when moving between systems, for example for handling VoIP traffic when moving between packet switched systems such as EVDO (Evolution Data-Only) subnets.

BACKGROUND

EVDO provides for the wireless transmission of data using radio signals and is typically, deployed alongside a wireless carrier's voice services. QoS (quality of service) capabilities were first introduced to EVDO in a revision of the standard referred to as the IS-856-A Protocol Standard. Later revisions also support QoS capabilities. If voice traffic is carried over EVDO, it is typically carried using VoIP (voice over IP), and a QoS mechanism is provided to ensure delay sensitivity requirements for VoIP are satisfied. QoS flows for VoIP include a signalling flow and a media flow having QoS parameters suited for VoIP. Another flow may be set up for other traffic such as e-mail, internet etc. The other flow may, for example, be serviced on a best effort basis. The best effort flow is the default flow where all other data traffic goes through, not part of QoS.

An EVDO subnet is a group of cells that share the same identifier and within which a mobile device can move around without losing its initial session configuration. When a mobile device moves from a current serving EVDO subnet to a new EVDO subnet, the device assumes QoS flows will be transferred properly. When the mobile device attempts to make a new VOIP call in the new subnet, it is assumed that the QoS flows are already in place, and as such low latency performance is expected.

BRIEF DESCRIPTION OF THE DRAWINGS

Embodiments of the disclosure will now be described with reference to the attached drawings in which.

DETAILED DESCRIPTION

It should be understood at the outset that although illustrative implementations of one or more embodiments of the present disclosure are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A broad aspect of the disclosure provides a method in a mobile device comprising:

upon determining that the mobile device has moved from a first QoS-aware system in which there is at least one first QoS flow reserved for the mobile device, to a second QoS-aware system:

requesting de-allocation of at least one second QoS flow in the second QoS-aware system;

initiating reservation of at least one third QoS flow in the second QoS-aware system.

Another broad aspect of the disclosure provides a mobile device comprising:

at least one wireless access radio;

at least one antenna;

a QoS flow re-establisher configured to:

determine whether the mobile device has moved from a first QoS-aware system in which there is at least one first QoS flow reserved for the mobile device, to a second QoS-aware system;

upon determining that the mobile device has moved from a first QoS-aware system in which there is at least one first QoS flow reserved for the mobile device, to a second QoS-aware system:

request de-allocation of at least one second QoS flow in the second QoS-aware system; and initiate reservation of at least one third QoS flow in the second QoS-aware system.

Further aspects provide a computer readable medium having computer executable instructions stored thereon for execution by a mobile device which when executed, cause the mobile device to perform one of the above-summarized methods, or one of the methods disclosed herein. Further aspects provide a wireless device or network component(s) configured to perform one of the above-summarized methods or one of the methods disclosed herein.

As indicated in the background, when a mobile device moves from a current serving EVDO subnet to a new EVDO subnet, the mobile device assumes QoS flow(s) will be transferred properly. When the mobile device attempts to make a new VOIP call in the new subnet, it is assumed that the QoS flow is already in place, and as such low latency performance is expected. In a live air environment, it has been shown that this is not always the case. Specifically, after movement from a current serving EVDO subnet to a new subnet, it may or may not be the case that the QoS flow(s) are properly transferred. This caused subsequent calls to go on the best effort flows which degraded voice quality and introduced signaling delay.

In a first example, if a mobile device is idle and ping ponging between different EVDO subnets, there were cases when QoS flows were not transferred successfully. This caused subsequent VOIP calls to go on the best effort flows which degraded voice quality and introduced signaling delay.

In a second example, if the mobile device is in an ongoing VOIP call in an EVDO QoS-aware system and moves back and forth between different EVDO subnets, the QoS flows may not get successfully transferred during an active handoff. This will cause the ongoing VOIP call to go to on the best effort flow and the same will happen to subsequent VOIP calls.

Figure 1:
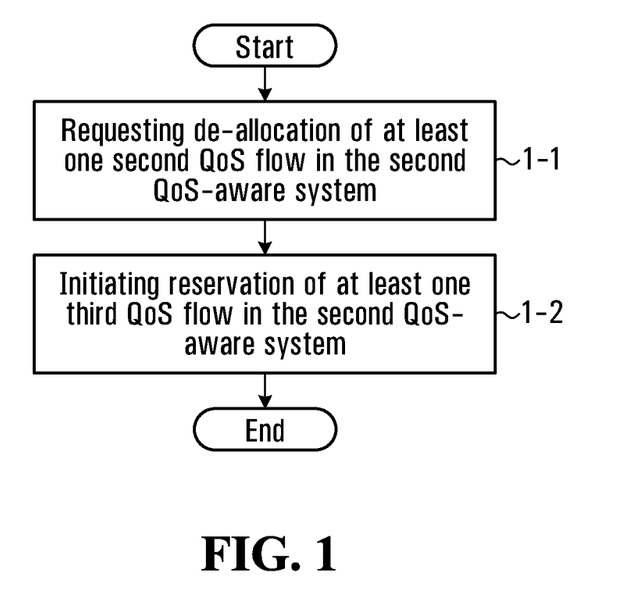
FIG. 1 is a flowchart of a method of initiating QoS-aware flow re-establishment.

Referring now to FIG. 1, shown is a flowchart of a method for execution by a mobile device, such as mobile device 10 of FIG. 3 described below, mobile device 100 of FIG. 4 described below, or another mobile device. The method begins with requesting de-allocation of at least one second QoS flow in the second QoS-aware system (block 1-1). This is performed upon determining that the mobile device has moved from a first QoS-aware system in which there is at least one first QoS flow reserved for the mobile device, to a second QoS-aware system. The method continues in block 1-2 with initiating reservation of at least one third QoS flow in the second QoS-aware system. In the above, a "first QoS flow" is a QoS flow in the first QoS aware system, a "second QoS flow" is a QoS flow (which may or may not exist) in the second QoS aware system before requesting de-allocation, and a "third QoS flow" is a QoS flow in the second QoS-aware system after initiating reservation within the second QoS aware system. In some embodiments, requesting de-allocation is performed irrespective of whether the at least one second QoS flow actually exists. For the purpose of this description, each QoS-aware system is a distinct group of cells; the groups of cells are distinct in the sense that each cell can only belong to one such group. When a mobile device moves from one QoS-aware system to another QoS aware system, the mobile device executes the method of FIG. 1. In some implementations, the cells of a given QoS-aware system share a common identifier to enable the mobile device to know when it has moved from one QoS-aware system to another. An EVDO subnet is a specific example of a QoS-aware system.

A QoS flow may, for example be a packet flow in respect of which the network is expected to provide a defined quality of service. The defined quality of service may be defined in any suitable way. It may for example be defined using one or more quality of service criteria. These may be based on one or more performance bases such as delay, packet drop rate, jitter, buffering, etc.

In a specific example, the first QoS-aware system is a first EVDO subnet, and the second QoS-aware system is a second EVDO subnet. However, more generally, the method may be applied wherever there may be a benefit to de-allocating and then initiating reservation of QoS flows following movement from a first QoS-aware system to a second QoS-aware system.

In some embodiments, the requesting de-allocation of at least one second QoS flow in the second QoS-aware system is performed irrespective of whether the second QoS flow(s) actually exist.

In some embodiments, the first QoS flow(s) include at least one signalling flow and at least one media flow. In this case, requesting de-allocation of the second QoS flow(s) involves requesting de-allocation of at least one signalling flow and at least one media flow, and requesting reservation of the third QoS flow(s) involves requesting reservation of at least one signalling flow and at least one media flow.

In some embodiments, the de-allocation and reservation is performed in respect of all of the flows of the mobile device. In this case, assuming that the at least one flow includes all of the flows of the mobile device for each of the at least one first QoS flow, the mobile device requests de-allocation of a corresponding second flow. For each such first QoS flow, the mobile device initiates reservation for a corresponding third QoS flow.

In some embodiments, the mobile device is able to determine in some cases whether a particular flow has been transferred properly. For example, after moving to a second QoS-aware system, if the mobile device transmits a request to turn on a particular media flow, and the request is accepted, the mobile device can conclude that the particular media flow was properly transferred. In some embodiments, the mobile device only performs the de-allocation and initiation of reservation in respect of each QoS flow for the mobile device in the first QoS-aware system which the mobile device has not verified to have been properly transferred to the second QoS-aware system.

Upon completion of the method of FIG. 1, the mobile device may request that the signalling flow(s) reserved in the second QoS-aware system be turned on.

In each case, the signalling flow(s) may include an uplink signalling flow, a downlink signalling flow, or both an uplink signalling flow and a downlink signalling flow. The media flow(s) may include an uplink media flow, a downlink media flow, or both an uplink media flow and a downlink media flow.

In some embodiments, the initiating and requesting are performed within an application layer of the mobile device.

The application layer may determine whether the mobile device has moved from a first QoS-aware system in which there is at least one first QoS flow reserved for the mobile device, to a second QoS-aware system. This may, for example, be done by the application layer obtaining service information identifying service type and system from a layer below the application layer. In a specific example, this is achieved by performing periodic polling for this service information.

In some embodiments, after moving from the first QoS-aware system to the second QoS-aware system, the mobile device requests de-allocation of the QoS flows, and initiates reservation only after having settled in the second QoS-aware system.

In some embodiments, after moving from the first QoS-aware system to the second QoS-aware system, the mobile device requests de-allocation of the QoS flows, and initiates reservation only after a delay. The delay may, for example, be measured from a time when second QoS-aware system is successfully acquired.

In some embodiments, the mobile device starts a timer upon successfully acquiring the second QoS-aware system, and uses the timer to measure the delay. In such embodiments, the requesting de-allocating and initiating reservation are performed upon expiry of the timer.

In some embodiments, the mobile device resets the timer if, before expiry of the timer, the mobile device requests a move to a QoS-aware system other than the second QoS-aware system.

In a specific example, requesting de-allocation involves requesting de-allocation of at least one QoS flow in the second QoS-aware system using a ReservationOFFRequest message. This is an EVDO message, defined in the IS-856-A Protocol Standard.

In a specific example, the method of transferring flows further involves initiating a GAUP (General Attribute Update request Protocol) session and using the GAUP session for the initiating reservation. GAUP is a protocol that is available in EVDO defined in IS-856-A for updating parameters.

In some embodiments, using the GAUP session for the initiating reservation involves using an AttributeUpdateRequest message.

In some embodiments, the mobile device is configured such that if a new session requiring a QoS flow is initiated (e.g. a new VoIP call is initiated) in the second QoS-aware system before said requesting de-allocation, the mobile device waits until the session is complete before requesting de-allocation.

In some embodiments, the mobile device is configured such that if a session employing a QoS flow is in progress (e.g. a VoIP call) when the mobile device moves from the first QoS-aware system to the second QoS-aware system, the mobile device waits until the session is complete before said requesting de-allocation.

The method may involve actively making a determination of whether the mobile device has moved from a first QoS-aware system in which there is at least one first QoS flow reserved for the mobile device, to a second QoS-aware system. The above-described polling mechanism is a specific example of this.

Figure 2A:
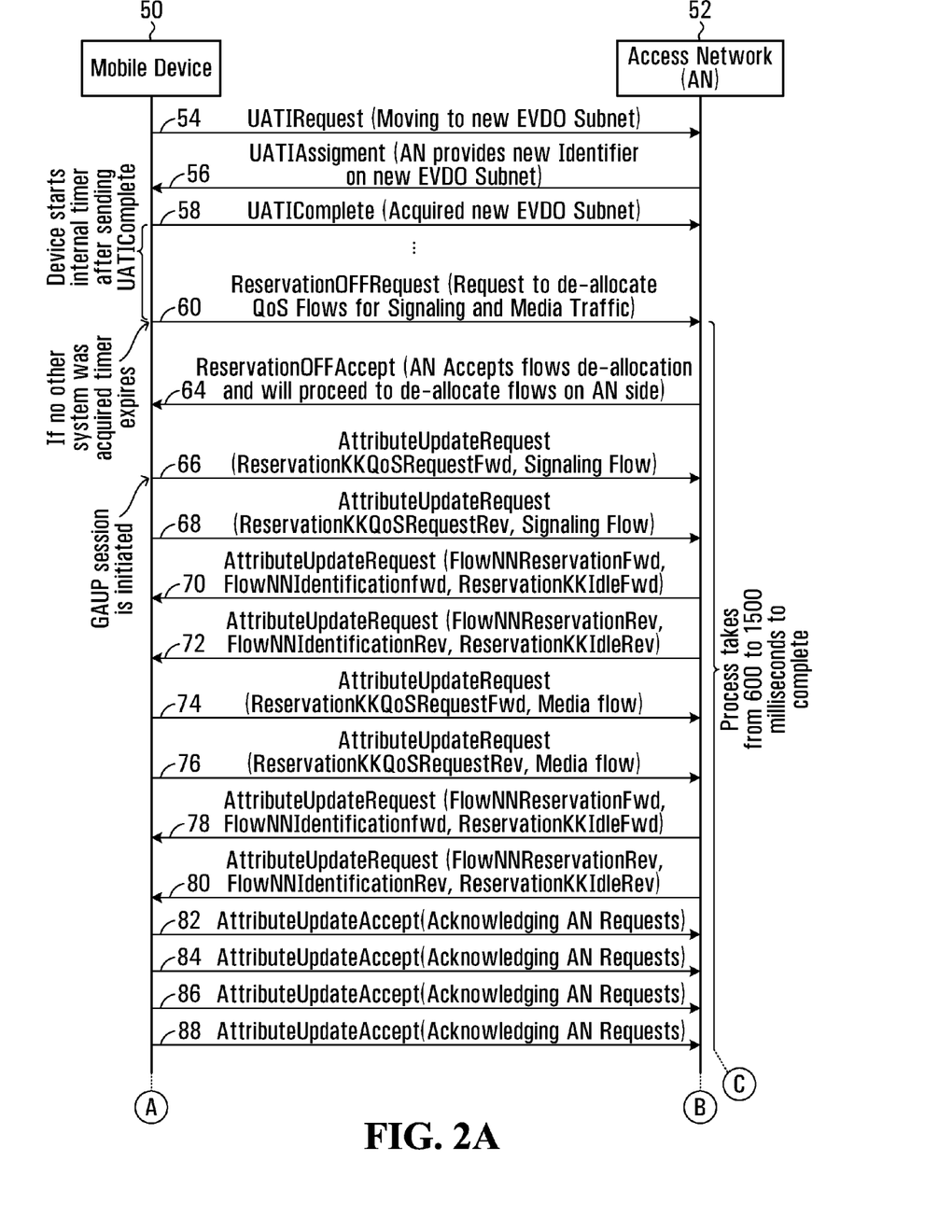
FIGS. 2A and 2B are detailed call flows for moving QoS flows between EVDO subnets.
Figure 2B:
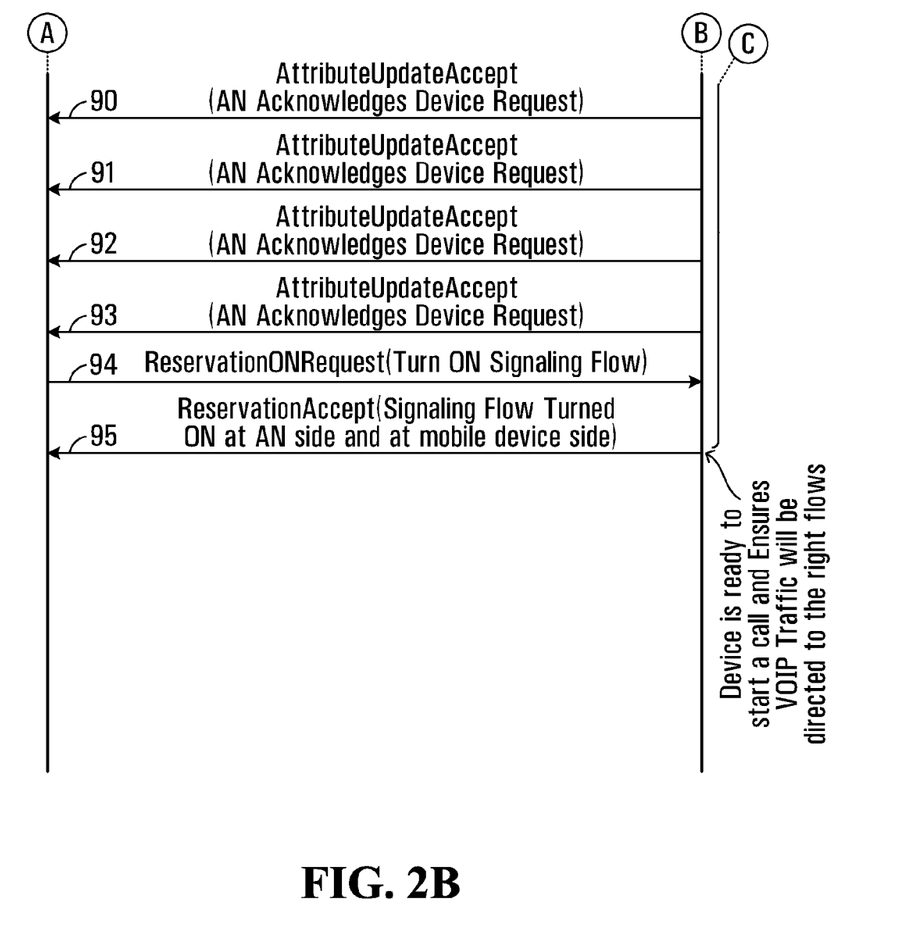

Referring now to FIGS. 2A and 2B, a detailed example call flow will be described. Shown is an exchange between a mobile device 50 and an access network 52. The specific order of the steps shown in FIGS. 2A and 2B need not be followed in all cases. For the purpose of this example, it is assumed that access network 52 is composed of multiple QoS-aware systems (such as EVDO subnets), and that it is time for the mobile device to move to a new system. For example, the mobile device 50 may have been looking at signal strengths for different systems on an ongoing basis, and may have determined that it is an appropriate time to switch systems.

Referring first to FIG. 2A, at 54, the mobile device 50 transmits a UATIRequest to the access network 52 to request a new UATI (unique access terminal identifier). The UATIRequest may be transmitted over an over-the-air access channel. A UATI is an identifier used by the network (EVDO subnet) to identify the mobile device. It may also be used by the Network to know how many sessions are established under this EVDO subnet. At 56, the access network 52 responds with a UATIAssignment thereby providing a new identifier on the new system to the mobile device 50. The access network response may be sent over a control channel, such as a broadcast control channel. At 58, the mobile device 50 sends a UATIcomplete to indicate that the session has been transferred, and that the new system has been acquired. At this time, forward and reverse traffic channels are available; the QoS flows are established over these traffic channels.

Note that other steps may also take place which are not shown in the interest of brevity. For example, in the background, the session transfer on the network side takes place. This may or may not result in the transfer of all of the QoS flows.

At 60, the mobile device sends a Reservation OFFRequest which is a request to the network to de-allocate at least one QoS flow. For the purpose of the remainder of this example, it is assumed that the QoS flows include a first QoS flow for uplink signalling, a second QoS flow for uplink media traffic, a third QoS flow for downlink signalling, and a fourth QoS flow for downlink media traffic. This message may, for example, be sent on a reverse traffic channel. In some embodiments, if no forward traffic channel is available, then one is established.

In some embodiments, a mobile device waits until it is settled in the new system before sending the ReservationOFFRequest. In a specific example, the mobile device starts a timer upon sending UATIComplete on the new system. If the mobile device moves across systems, the timer will be reset. If the timer expires on the last system within which the mobile device sent a UATIComplete, the mobile device will initiate re-establishment of QoS flows.

In some embodiments, if after the UATIComplete is sent to the network, a session configuration is requested from the network, the timer will be cancelled since the session configuration will already include a de-allocation and allocation of QoS flows. A session configuration causes an entire existing session configuration to be cleared. New negotiation with the network is performed to re-established QoS flows. Session configuration is typically network initiated, but can also be mobile device initiated. In some embodiments session configuration begins with an instruction to clear the existing session, for example a session close message. In some embodiments, receipt of an instruction to clear the existing session is used as a trigger to reset the timer.

At 64, a ReservationOFFAccept is received from the network indicating that the access network accepts the flow de-allocation and that the network will proceed to de-allocate flows on the access network side. This message may, for example, be sent on a forward traffic channel. In some embodiments, if no forward traffic channel is available, then one is established.

At 66, the mobile device initiates a GAUP (General Attribute Update request Protocol) session by sending an AttributeUpdateRequest (ReservationKKQoSRequestFwd, signalling flow). This is a request for reservation of resources for a downlink signalling flow. GAUP is a protocol that is available in EVDO for updating parameters. Note that the step of initiating the GAUP session may take place any time. It may, for example occur before and irrespective of whether the ReservationOFFAccept is received from the network.

At 68, the mobile device sends an AttributeUpdateRequest (ReservationKKQoSRequestRev, signalling flow). This is a request for reservation of resources for an uplink signalling flow.

At 70, the access network responds with an AttributeUpdateRequest (FlowNNReservationFwd, FlowNNIidentificationFwd, ReservationKKIdleFwd) which contains information to set up the downlink signalling flow.

At 72, the access network responds with an AttributeUpdateRequest (FlowNNReservationFwd, FlowNNIidentificationFwd, ReservationKKIdleRev) which contains information to set up the uplink signalling flow.

At 74, the mobile device sends an AttributeUpdateRequest (ReservationKKQoSRequestFwd, media flow). This is a request for reservation of resources for a downlink media flow.

At 76, the mobile device sends an AttributeUpdateRequest (ReservationKKQoSRequestRev, media flow). This is a request for reservation of resources for an uplink media flow.

At 78, the access network responds with an AttributeUpdateRequest (FlowNNReservationFwd, FlowNNIidentificationFwd, ReservationKKIdleFwd) which contains information to set up the downlink media flow.

At 80, the access network responds with an AttributeUpdateRequest (FlowNNReservationFwd, FlowNNIidentificationFwd, ReservationKKIdleRev) which contains information to set up the uplink media flow.

At 82, 84, 86, 88, the mobile device acknowledges access network requests with respective AttributeUpdateAccept messages. With reference now to FIG. 2B, the call flow continues with, at 90, 91, 92, 93, the access network acknowledges mobile device requests with respective AttributeUpdateAccept messages. When all the acknowledgements have been sent and received, the GAUP session is completed.

In some embodiments, the signalling flows are set up as flows that are always on, and the media flows are turned on when needed, for example when a VOIP call is triggered.

At 94, the mobile device sends two ReservationOnRequest's to turn on the uplink and downlink signalling flows.

At 96, the access network sends two ReservationAccept's indicating that the signalling flows are on at the network side for both uplink and downlink.

In some embodiments, with the above-described procedure, if a session needing a QoS flow is initiated before the mobile device has settled in the new system, the session may be carried on a flow that does not necessarily satisfy the QoS expected for the session; for example, the session may be carried on a best effort flow. The mobile device waits until such a session is complete before initiating QoS flow re-establishment. However, in the event the QoS flows were properly transferred, the session may be carried on the proper flows. For example, after detecting a new QoS aware system, the mobile device may request that the media flows be turned on. If the request is granted, then the session can be carried using the proper media flows. In some embodiments, after the session is complete, the QoS flow re-establishment is performed for all of the QoS flows. In some embodiments, after the session is complete, the QoS flow re-establishment is performed only for flows that the mobile device has not been able to verify to have been properly transferred.

In some embodiments, if a session needing a QoS flow is in progress when the mobile device moves to the new system, the session may be carried on a flow that does not necessarily satisfy the QoS expected for the session; for example, the session may be carried on a best effort flow. The mobile device waits until such a session is complete before initiating QoS flow re-establishment. However, in the event the QoS flows were properly transferred, the session may be carried on the proper flows. In some embodiments, after the session is complete, the QoS flow re-establishment is performed for all of the QoS flows. In some embodiments, after the session is complete, the QoS flow re-establishment is performed only for flows that the mobile device has not been able to verify to have been properly transferred.

Figure 3:
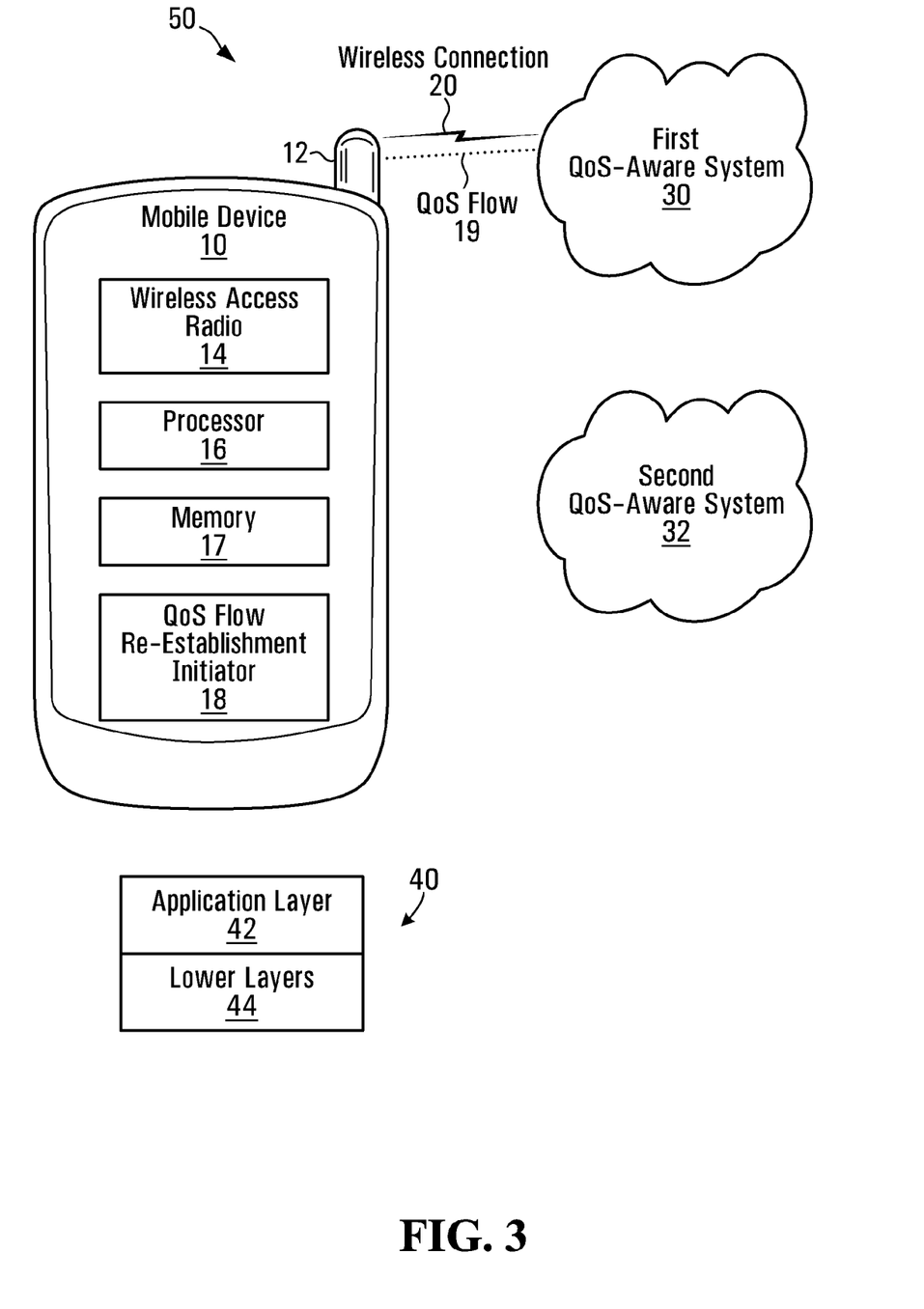
FIG. 3 is a block diagram of a mobile device as it moves between two QoS-aware systems.

Referring now to FIG. 3, shown is a block diagram of an example wireless system 50 featuring a mobile device 10 that initiates QoS flow re-establishment. The mobile device 10 has at least one antenna 12, at least one wireless access radio 14, a processor 16, a memory 17, and a QoS flow re-establishment initiator 18. Also shown is an example of a protocol stack 40 that might be implemented on the mobile device, shown to include an application layer 42 and lower layers 44. The mobile device 10 may have other components, but they are not shown for simplicity. The wireless system 50 is shown with a first QoS-aware system 30 and a second QoS-aware system 32. These may, for example, be EVDO subnets. More generally, there may be any number of QoS-aware systems. Furthermore, at the instant depicted, the mobile device 10 is shown in wireless communication with the first QoS-aware system 30. More generally, mobile device 10, being a mobile device, is subject to moving between various QoS-aware systems such as, but not limited to, QoS-aware systems 30,32. Each QoS-aware system is configured to respond to QoS flow re-establishment initiations received from mobile devices, such as from the mobile device 10. In a specific example (not shown), each QoS-aware system includes an RNC (radio network controller) connected to a set of base stations, and the GAUP exchange takes place between the mobile station and the RNC, with one of the base stations providing the wireless link to the mobile device.

In the illustrated example, the QoS re-establishment initiator 18 is shown as a distinct component. However, it is to be understood that the QoS re-establishment initiator 18 might be part of another component. In a specific example, the QoS re-establishment initiator 18 is implemented in the application layer 42.

In a specific example, the QoS re-establishment initiator 18 is implemented as software and is executed on the processor 16. However, more generally, the QoS re-establishment initiator 18 may be implemented as software and a processing platform to run the software such as processor 16, hardware, firmware, or any appropriate combination thereof.

In operation, the QoS flow re-establishment initiator 18 determines whether the mobile device has moved from any first QoS-aware system in which there is at least one first QoS flow reserved for the mobile device, to any second QoS-aware system. This step may, for example, be triggered when a new a new UATI is assigned, more generally, when a new identifier for the mobile terminal in the network is assigned. When this occurs, the first QoS aware flow may or may not have been moved to the second QoS-aware system. Upon determining that the mobile device has moved from a first QoS-aware system in which there is at least one first QoS flow reserved for the mobile device, to a second QoS-aware system, the QoS flow re-establishment initiator 18 requests de-allocation of at least one second QoS flow in the second QoS-aware system. As discussed previously, the second QoS flow may or not exist. Then, the QoS flow re-establishment initiator 18 initiates reservation of at least one third QoS flow in the second QoS-aware system.

A specific example of the above-described functionality will now be described where it is assumed that mobile device 10 is communicating with the first QoS-aware system 30 over a wireless connection 20 using the wireless access radio 14, and that the mobile device moves from the first QoS-aware system 30 to the second QoS-aware system 32. At least one QoS-aware flow 19 is reserved in the first QoS-aware system 30, shown as QoS flow 19. After the mobile device moves from the first QoS-aware system 30 to the second QoS-aware system, the QoS flow re-establishment initiator 18 determines that the mobile device has moved from the first QoS-aware system 30 in which there is at least one first QoS flow reserved for the mobile device, to the second QoS-aware system 32. The at least one QoS flow 19 may or may not have been established as corresponding second QoS flows in the second QoS-aware system 32. The QoS flow re-establishment initiator 18 requests de-allocation of second QoS flows in the second QoS-aware system 32. In some embodiments, this involves requesting de-allocation of a respective second QoS flow for each of the at least one first QoS flow. Again, it is to be emphasized that these second QoS flows may or may not exist, but the mobile station still requests de-allocation. Following that, the QoS flow re-establishment initiator 18 Then, the QoS flow re-establishment initiator 18 initiates reservation of at least one third QoS flow in the second QoS-aware system 32. In some embodiments, this involves initiating reservation of a respective third QoS flow for each of the at least one first QoS flow.

In some embodiments, each QoS flow has an identifier that does not change upon a session transfer. The mobile device is able to determine what to de-allocate in the second system, because each QoS flow, if established in the second system, will have the same identifier as it did in the first system.

Another Mobile Device

Figure 4:
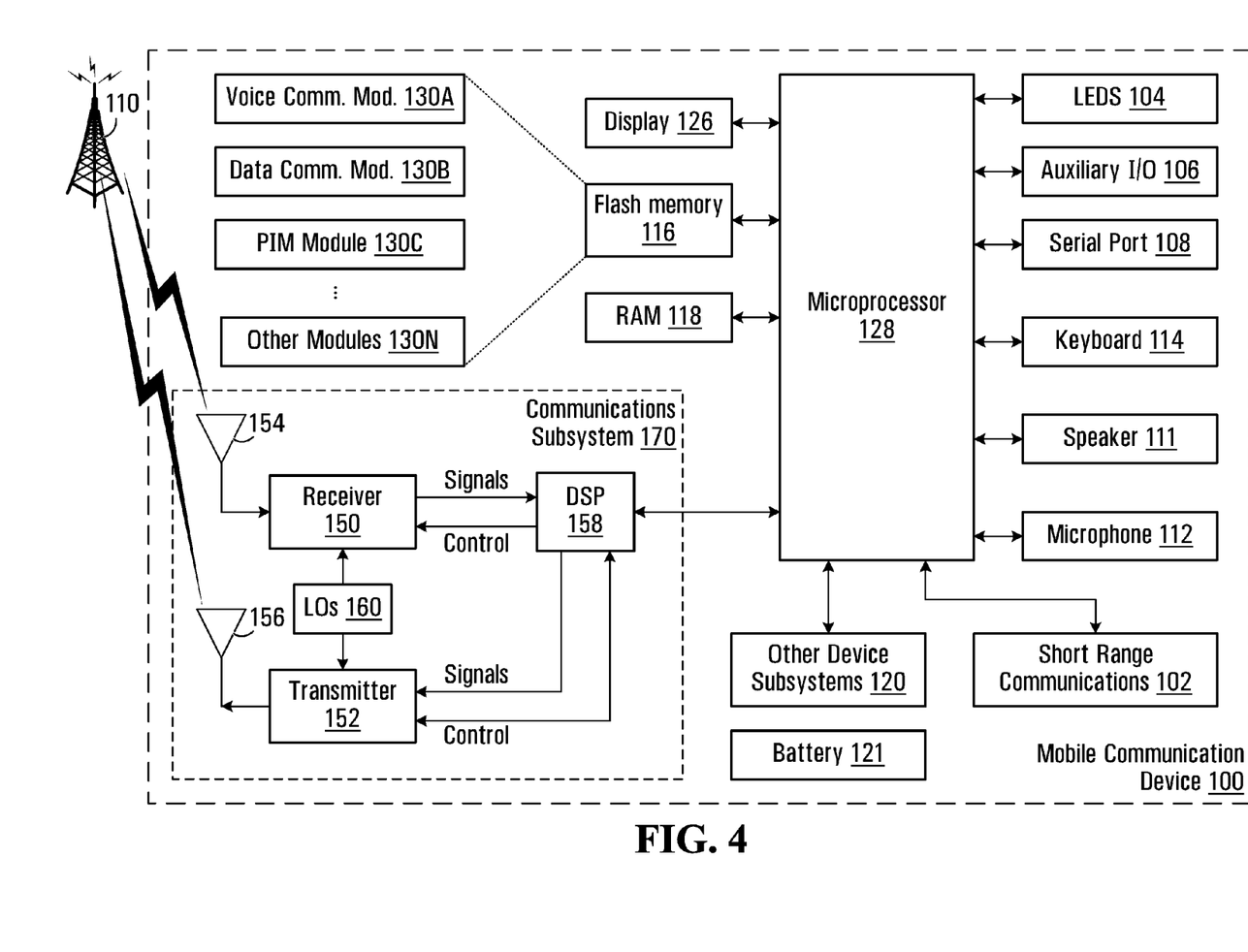
FIG. 4 is a block diagram of another mobile device.

Referring now to FIG. 4, shown is a block diagram of another mobile device 100 that may implement any of the device methods described herein. The mobile device 100 is shown with specific components for implementing features similar to those of the mobile device 10 shown in FIG. 3. It is to be understood that the mobile device 100 is shown with very specific details for the purpose of example only.

A processing device (a microprocessor 128) is shown schematically as coupled between a keyboard 114 and a display 126. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the QoS Flow Re-establishment Initiator 18 of the mobile device 10 shown in FIG. 3. In a specific implementation, the other module 130N of the flash memory 116 stores computer executable instructions that when executed implement a QoS Flow Re-establishment initiator. Note that the implementations described with reference to FIG. 4 are very specific for exemplary purposes.

Communication functions, including data and voice communications, are performed through the communication subsystem 170, and possibly through the short-range communications subsystem 102. The communication subsystem 170 includes a receiver 150, a transmitter 152, and one or more antennas, illustrated as a receive antenna 154 and a transmit antenna 156, and a GPS antenna 164. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practiced otherwise than as specifically described herein.

We claim:

1. A method in a mobile device comprising:
upon determining that the mobile device has moved from a first QoS (Quality of Service) aware system in which there is at least one first QoS flow reserved for the mobile device, to a second QoS-aware system:
requesting de-allocation of a respective second QoS flow in the second QoS-aware system for each of said at least one first QoS flow;
initiating reservation of a respective third QoS flow in the second QoS-aware system for each of said at least one first QoS flow;
after moving from the first QoS-aware system to the second QoS-aware system, performing said requesting de-allocation and initiating reservation only after a delay
wherein the delay is measured from successfully acquiring the second QoS-aware system
starting a timer upon successfully acquiring the second QoS-aware system, the timer being used to measure the delay;
performing said requesting de-allocation and initiating reservation upon expiry of the timer.

2. The method of claim 1 wherein requesting de-allocation of the respective second QoS flow in the second QoS-aware system comprises:
requesting de-allocation of the respective second QoS flow in the second QoS-aware system irrespective of whether the respective second QoS flow actually exists.

3. The method of claim 1 wherein:
the at least one first QoS flow comprises at least one first signalling flow and at least one first media flow;
requesting de-allocation of the respective second QoS flow comprises requesting de-allocation of at least one second signalling flow and at least one second media flow;
initiating reservation of the respective third QoS flow comprises requesting reservation of at least one third signalling flow and at least one third media flow.

4. The method of claim 3 wherein the at least one first signalling flow comprises an uplink signalling flow and a downlink signalling flow and the at least one first media flow comprises an uplink media flow and a downlink media flow;
requesting de-allocation of the respective second QoS flow comprises requesting de-allocation of a second uplink signalling flow, a second downlink signalling flow, a second uplink media flow and a second downlink media flow;
requesting reservation of the respective third QoS flow comprises requesting reservation of a third uplink signalling flow, a third downlink signalling flow, a third uplink media flow and a third downlink media flow.

5. The method of claim 1 wherein:
the initiating reservation and the requesting de-allocation are performed within an application layer of the mobile device;
the method further comprising:
the application layer determining whether the mobile device has moved from the first QoS-aware system to the second QoS-aware system by obtaining service information identifying service type and system from a layer below the application layer.

6. The method of claim 1 further comprising:
after moving from the first QoS-aware system to the second QoS-aware system, performing said requesting de-allocation and initiating reservation only after having settled in the second QoS-aware system.

7. The method of claim 1 further comprising:
resetting the timer if, before expiry of the timer, the mobile device requests a move to a QoS-aware system other than the second QoS-aware system.

8. The method of claim 1 further comprising:
resetting the timer if, before expiry of the timer, a session configuration has been requested.

9. The method of claim 1 wherein requesting de-allocation comprises:
requesting de-allocation of at least one QoS flow in the second QoS-aware system using a ReservationOFFRequest message.

10. The method of claim 1 further comprising:
initiating a GAUP (General Attribute Update request Protocol) session;
using the GUAP session for the initiating reservation.

11. The method of claim 10 wherein using the GUAP session for the initiating reservation comprises:
initiating reservation of at least one QoS flow in the second QoS-aware system using an AttributeUpdateRequest message.

12. The method of claim 1 further comprising:
requesting that signalling flows reserved in the second QoS-aware system be turned on.

13. The method of claim 1 further comprising:
if a new session requiring a QoS flow is initiated in the second QoS-aware system before said requesting de-allocation, waiting until the session is complete before said requesting deallocation.

14. The method of claim 1 further comprising:
if a session employing a QoS flow is in progress when the mobile device moves from the first QoS-aware system to the second QoS-aware system, waiting until the session is complete before said requesting de-allocation.

15. The method of claim 1 further comprising:
determining whether the mobile device has moved from the first QoS-aware system to the second QoS-aware system.

16. The method of claim 15 wherein determining whether the mobile device has moved from the first QoS-aware system to the second QoS-aware system comprises:
determining whether the mobile device has moved from a first EVDO (Evolution Data Only) system to a second EVDO system.

17. The method of claim 1 wherein the QoS flows are in respect of VoIP (Voice over Internet Protocol) communications.

18. The method of claim 1 wherein:
said requesting de-allocation of the respective second QoS flow in the second QoS-aware system comprises requesting de-allocation of the respective second QoS flow for each of said at least one first QoS flow for which the mobile device has been unable to verify to have been properly transferred to the second QoS-aware system;

said initiating reservation of the respective third QoS flow in the second QoS-aware system comprises initiating reservation of the respective third QoS flow for each of said at least one first QoS flow for which the mobile device has been unable to verify to have been properly transferred to the second QoS-aware system.

19. The method of claim 1, wherein said at least one first QoS flow comprises all QoS flows reserved for the mobile device in the first QoS-aware system.

20. A non-transitory computer readable medium having computer executable instructions stored thereon for execution by a mobile device which, when executed, cause the mobile device to implement the method:

upon determining that the mobile device has moved from a first QoS (Quality of Service) aware system in which there is at least one first QoS flow reserved for the mobile device, to a second QoS-aware system:

requesting de-allocation of a respective second QoS flow in the second QoS-aware system for each of said at least one first QoS flow;

initiating reservation of a respective third QoS flow in the second QoS-aware system for each of said at least one first QoS flow;

after moving from the first QoS-aware system to the second QoS-aware system, performing said requesting de-allocation and initiating reservation only after a delay wherein the delay is measured from successfully acquiring the second QoS-aware system starting a timer upon successfully acquiring the second QoS-aware system, the timer being used to measure the delay;

performing said requesting de-allocation and initiating reservation upon expiry of the timer.

21. A mobile device comprising:

a QoS flow re-establisher configured to:

upon determining that the mobile device has moved from a first QoS (Quality of Service) aware system in which there is at least one first QoS flow reserved for the mobile device, to a second QoS-aware system:

requesting de-allocation of a respective second QoS flow in the second QoS-aware system for each of said at least one first QoS flow;

initiating reservation of a respective third QoS flow in the second QoS-aware system for each of said at least one first QoS flow;

after moving from the first QoS-aware system to the second QoS-aware system, performing said requesting de-allocation and initiating reservation only after a delay wherein the delay is measured from successfully acquiring the second QoS-aware system starting a timer upon successfully acquiring the second QoS-aware system, the timer being used to measure the delay;

performing said requesting de-allocation and initiating reservation upon expiry of the timer.

22. A mobile device comprising:

at least one wireless access radio;

at least one antenna;

a QoS flow re-establisher configured to:

determine whether the mobile device has moved from a first QoS-aware system in which there is at least one first QoS flow reserved for the mobile device, to a second QoS-aware system;

upon determining that the mobile device has moved from the first QoS-aware system to the second QoS-aware system:

request de-allocation of a respective second QoS flow in the second QoS-aware system for each of said at least one QoS flow; and initiate reservation of a respective third QoS flow in the second QoS-aware system for each of said at least one first QoS flow after moving from the first QoS-aware system to the second QoS-aware system, performing said requesting de-allocation and initiating reservation only after a delay wherein the delay is measured from successfully acquiring the second QoS-aware system starting a timer upon successfully acquiring the second QoS-aware system, the timer being used to measure the delay;

performing said requesting de-allocation and initiating reservation upon expiry of the timer.

* * * * *